(12) United States Patent
Saarinen

(10) Patent No.: US 6,755,270 B2
(45) Date of Patent: Jun. 29, 2004

(54) CABIN STRUCTURE FOR A WORKING MACHINE

(75) Inventor: Into Saarinen, Pirkkala (FI)

(73) Assignee: Timberjack Oy, Tampere (FI)

( * ) Notice: Subject to any disclaimer, the term of this patent is extended or adjusted under 35 U.S.C. 154(b) by 97 days.

(21) Appl. No.: 09/980,318

(22) PCT Filed: Mar. 15, 2001

(86) PCT No.: PCT/FI01/00254
§ 371 (c)(1),
(2), (4) Date: Mar. 28, 2002

(87) PCT Pub. No.: WO01/68400
PCT Pub. Date: Sep. 20, 2001

(65) Prior Publication Data
US 2002/0121397 A1 Sep. 5, 2002

(30) Foreign Application Priority Data
Mar. 16, 2000 (FI) .............................. 20000613

(51) Int. Cl.⁷ .............................. B62D 33/08
(52) U.S. Cl. .............................. 180/89.13; 180/89.15; 180/327; 180/329; 180/330; 180/331; 296/190.04; 296/190.05; 296/190.08
(58) Field of Search .............................. 180/89.13, 89.14, 180/89.15, 89.12, 326, 327, 329, 330, 331; 296/190.01, 190.04, 190.05, 190.08

(56) References Cited
U.S. PATENT DOCUMENTS
4,392,546 A    7/1983  Brown et al. .............. 180/326
5,368,119 A  * 11/1994  Nystrom ................... 180/89.14
6,158,539 A  * 12/2000  Isley ........................ 180/89.14
6,398,293 B1 *  6/2002  Nystorm ................ 296/190.04

FOREIGN PATENT DOCUMENTS

| DE | 3405921 |   | 9/1985 |          |
|----|---------|---|--------|----------|
| EP | 0636512 |   | 2/1995 |          |
| FI | 991449  |   | 6/2000 |          |
| SE | 509528  |   | 8/1999 |          |
| SU | 765086  | * | 9/1980 | 296/190.1 |

OTHER PUBLICATIONS

International Search Report, Form PCT/ISA/210, as issued by Swedish Patent Office in Connection with PCT Appl. No. PCT/FI01/00254.

* cited by examiner

Primary Examiner—Eric Culbreth
(74) Attorney, Agent, or Firm—Quarles & Brady LLP

(57) ABSTRACT

A cabin structure for a working machine includes a substantially transparent cabin element equipped with a bottom part having a seat for the operator of the working machine, a display and a controller for controlling the operations of the working machine. The cabin structure also includes a control mechanism for tilting the cabin element in relation to the frame of the working machine in both XZ and YZ directions. The cabin element is arranged to be substantially stationary in relation to the frame of the working machine, and the seat and controller are placed on a working base placed above the bottom part of the cabin element. The control mechanism is pieced positioned between the working base and the bottom part of the cabin element. The control mechanism can also rotate the working base around the Z axis.

20 Claims, 5 Drawing Sheets

CABIN STRUCTURE FOR A WORKING MACHINE

BACKGROUND OF THE INVENTION

1. Field of the Invention

The invention relates to a cabin structure for a working machine.

2. Description of the Related Art

According to prior art (e.g. SE patent publication 509528), the control mechanism is normally placed between the cabin structure and the frame of the working machine. Although these solutions have been functional as such, they have, at least in some applications, resulted in impractical constructions, because the requirement for space taken by the control mechanism increases the main dimensions of the working machine, i.e. its width, length and height. Other control mechanisms are presented in DE application publication 3405921, whose inclination is uncomfortable for the operator because of swinging. In the above-mentioned control mechanism, as well as in EP application publication 636512, the moving means are placed in such a way that levelling of the mechanism will cause tilting of the seat, which, in turn, must be corrected again by levelling.

SUMMARY OF THE INVENTION

It is an aim of this invention to present a novel cabin structure, whereby it is possible to provide, to a great extent, the movements of the cabin structure according to prior art, while also providing new possibilities for moving the cabin structure. Furthermore, the cabin structure according to the invention makes it possible that the main dimensions of the working machine are not increased, if so desired, but they can be kept reasonable, even though the control mechanism is more versatile. From the point of view of the operator of the working machine, the cabin structure meets the demands set for modern working facilities.

With the solution presented above, as the cabin element is stationary in relation to the frame of the working machine, a compact unit is provided, in which the control mechanism can be placed in a small space and it can also include third means for rotating the working base around the Z axis.

According to a particularly advantageous embodiment, the first and second means of the control mechanism for tilting of the working base are placed underneath the third means of the control mechanism. This solution has the advantage that the rotating of the working base around the Z axis can be implemented in a continuous manner after the levelling step performed by the first and second means in each working position of the working machine.

Furthermore, it is advantageous that the movements of the first and second means of the control mechanism for tilting of the working base are fitted to take place around a substantially joint centre of motion, preferably in such a way that the substantially joint centre of motion is on the Z axis. In this way, the ease at work of the person using the working means on the working base is optimised, particularly when the centre of motion of the control mechanism is placed above the seat part of the seat intended for the operator of the working machine, to be preferably placed substantially at the level of the operator's hip.

BRIEF DESCRIPTION OF THE DRAWINGS

The invention will be described in the description hereinbelow, in which reference is made to the embodiment shown in the appended drawings. In the drawings.

DETAILED DESCRIPTION OF THE INVENTION

Figure 1:
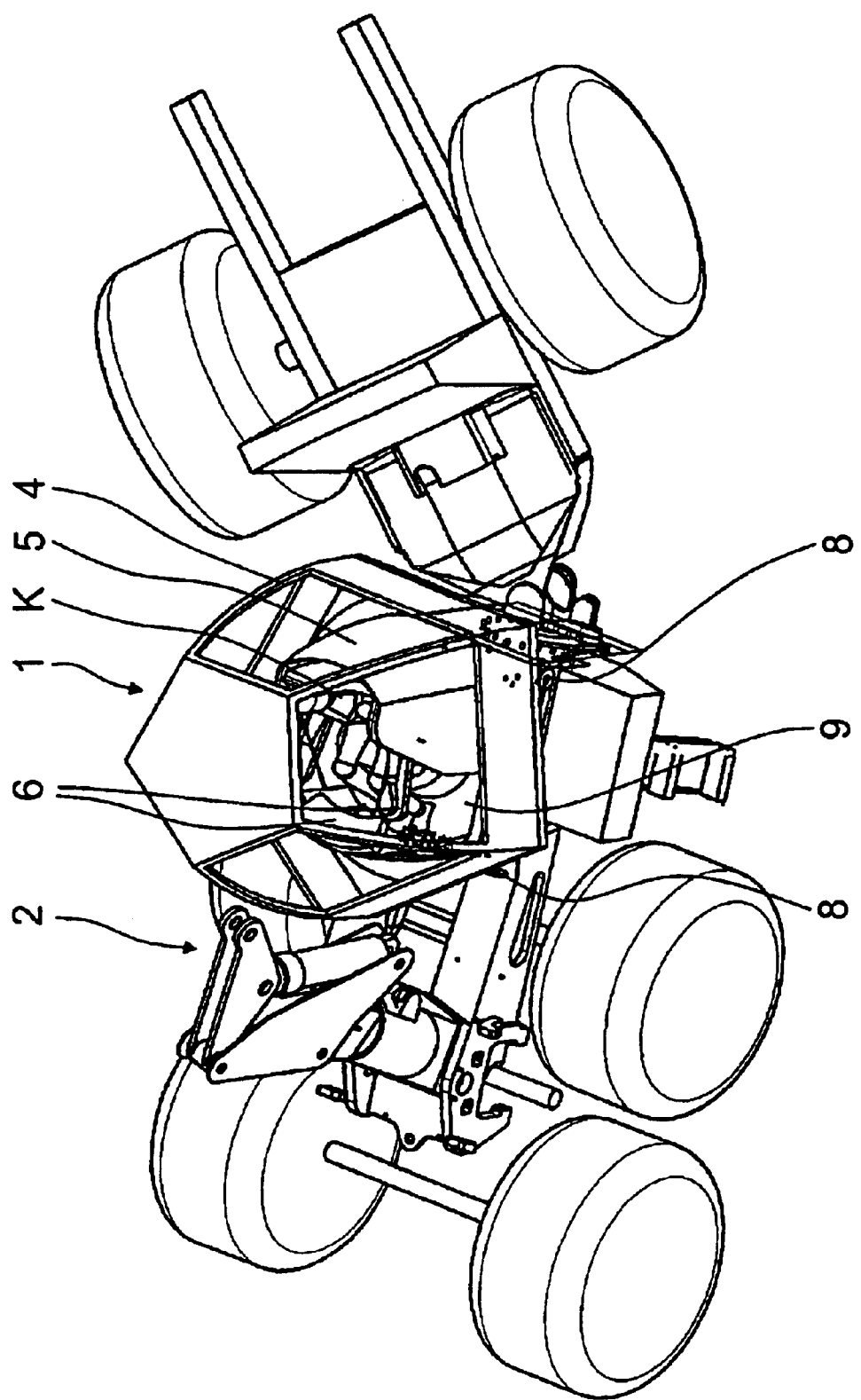
FIG. 1 shows schematically, in a slanted perspective view from above, a working machine, in connection with which an application of the cabin structure according to the invention is placed.
Figure 2:
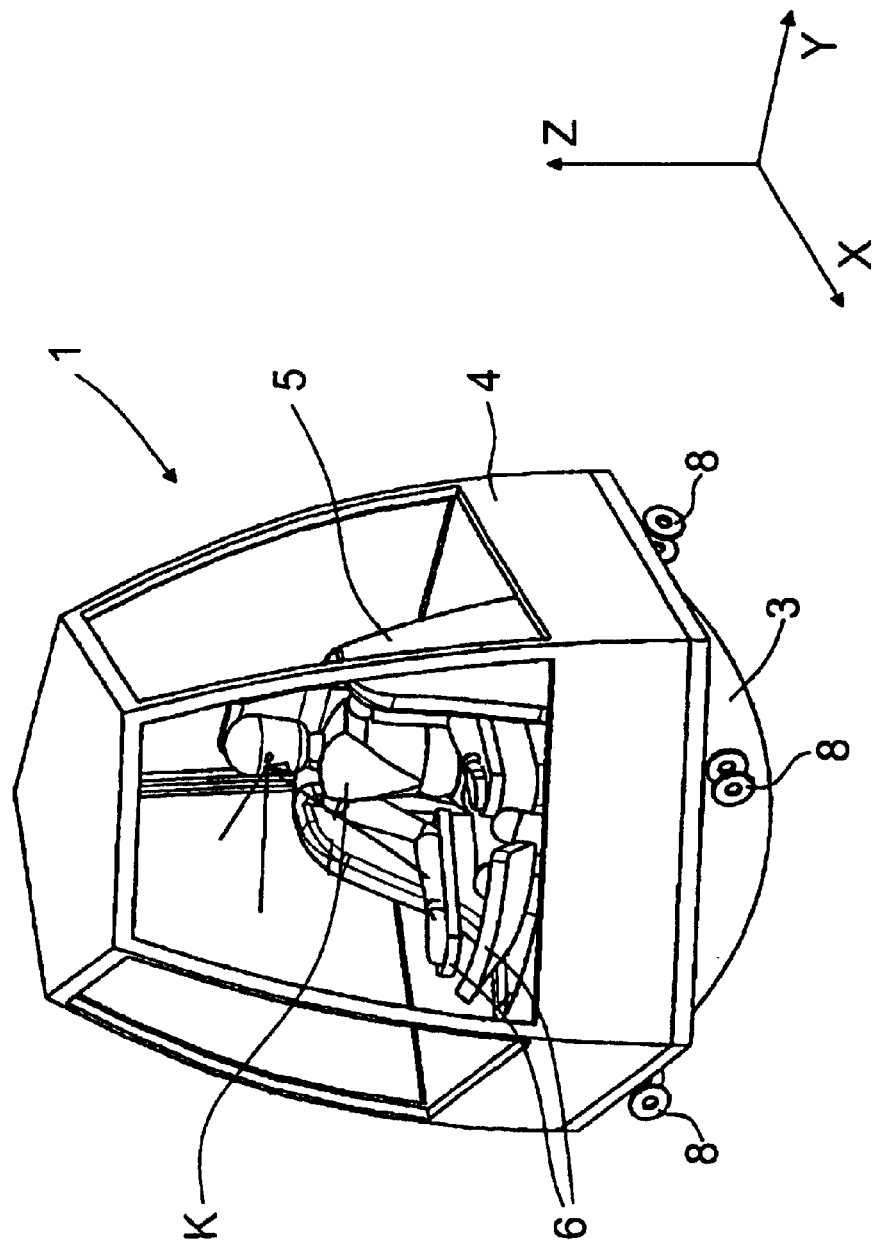
FIG. 2 shows, also in a slanted perspective view from above, an application of the cabin structure according to FIG. 1.
Figure 3:
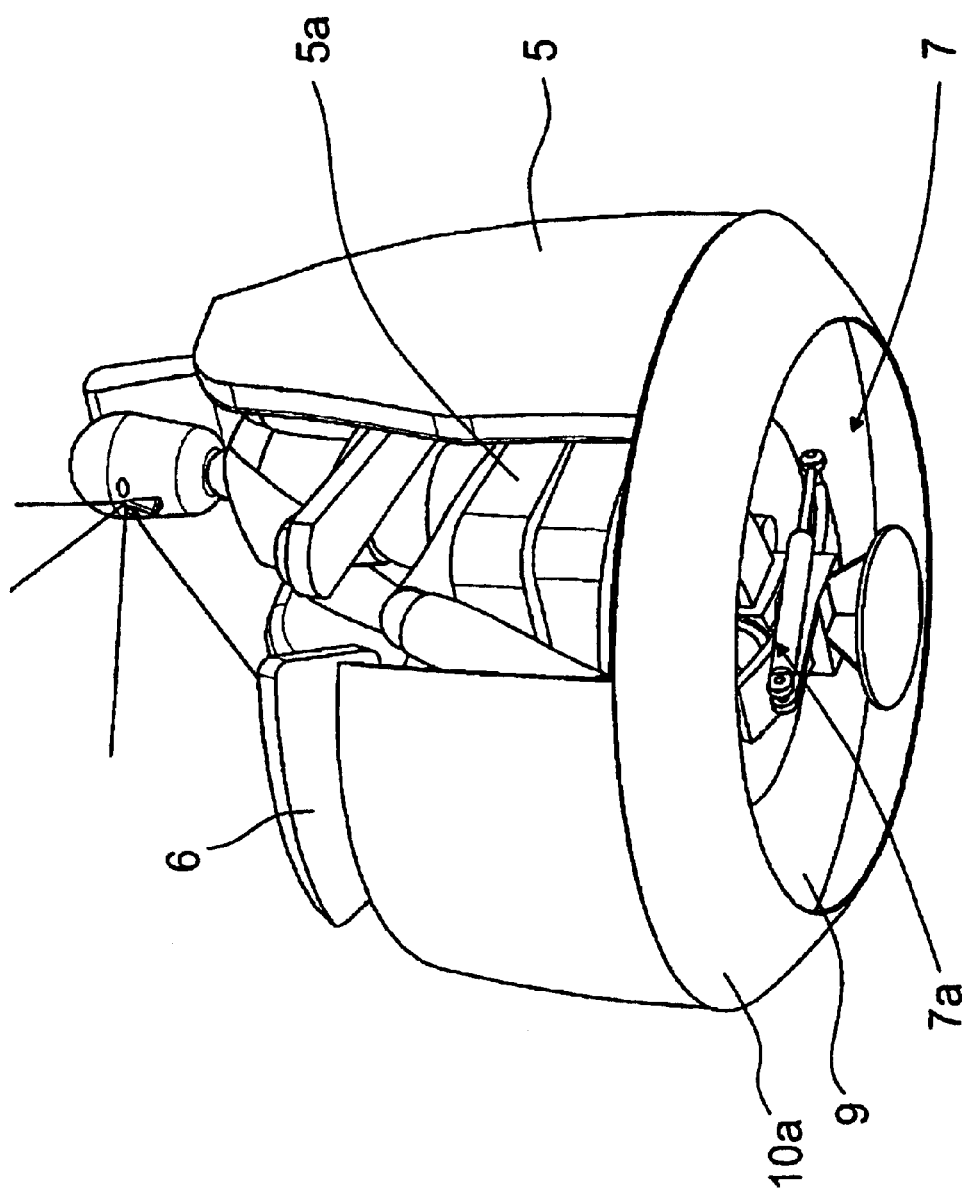
FIG. 3 shows, further in a slanted perspective view from above, tools and a control mechanism, which are used in connection with the application of the cabin structure according to FIG. 2.

Particularly with reference to FIG. 1, the cabin structure 1 is placed in connection with the working machine 2. In the presented application, the working machine is a forest working machine with frame steering, FIG. 1 showing only its most important parts. The cabin structure 1 (cf. particularly FIGS. 2 to 4) comprises a substantially transparent cabin element 4 equipped with a bottom part 3, as well as working means 5, 6 placed inside the cabin element 4, i.e. a seat 5 for the operator K of the working machine 2, and display and control means 6 for controlling the operations of the working machine 2. The cabin structure 1 also comprises a control mechanism 7 with means 7a, 7b and 7c coupled to each other, i.e. the first 7a and second 7b means for tilting the working means 5, 6 in relation to the body of the working machine 2 as well as in the planes XZ and YZ, and the third 7c means for rotating the working base around the Z axis. The orthogonal XYZ coordinate system is shown in FIG. 2, wherein the X direction is the horizontal longitudinal direction of the working machine, the Y direction is the horizontal transverse direction of the working machine (that is, the X and Y directions are perpendicular to each other), and the Z direction is the vertical direction.

According to a basic idea of the invention, the cabin element 4 is arranged to be substantially stationary in relation to the frame of the working machine 2. The outer surface of the bottom part 3 of the cabin element 4 is provided with connecting means 8, particularly lugs shown in FIG. 2, to connect the cabin structure 1 to the frame of the working machine 2. The bottom part 3 of the cabin element 4 is arranged to have a downwards reducing horizontal cross-section.

Furthermore, the working means 5, 6 are placed on a working base 9 placed on the bottom part 3 of the cabin element 4. In the presented embodiment, the shape of the working base 9 is a substantially circular plane surface, which also substantially constitutes the functional floor surface of the cabin structure 1. To the outer edge of the working base 9 is fixed an annular collar part 10a whose outer surface has an at least spherical shape and which extends downwards from the outer edge, towards the centre of the working base 9. Particularly for reasons of space saving, the working base 9 is elevated from its basic level underneath the seat part 5a of the seat 5 (see truncated conical part 9a in FIG. 4), wherein the space formed inside the elevated part 9a, underneath the seat part 5a of the seat 5, accommodates parts of the control mechanism 7, at least the third means 7c for rotating the working base around the Z axis.

Figure 4:
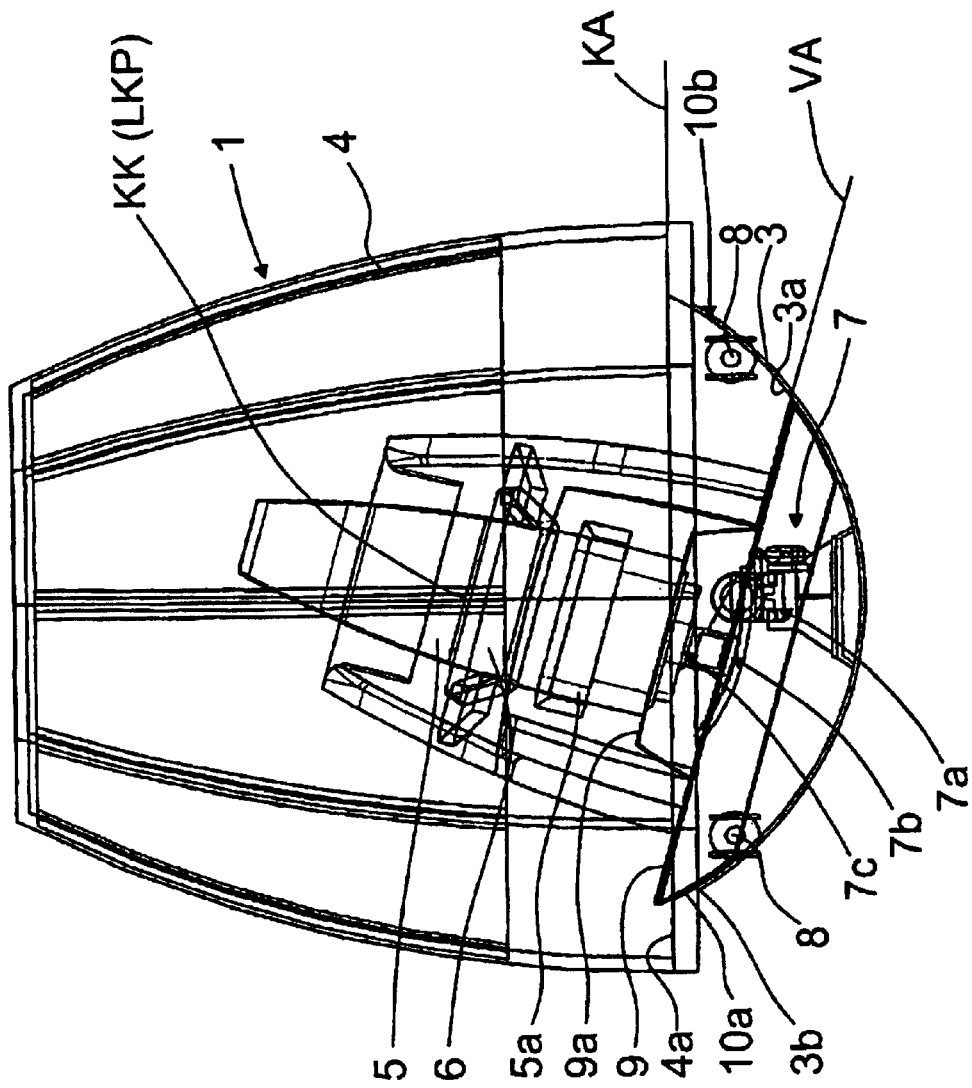
FIG. 4 shows the cabin structure according to FIG. 2 in a vertical cross-section.
Figure 5:
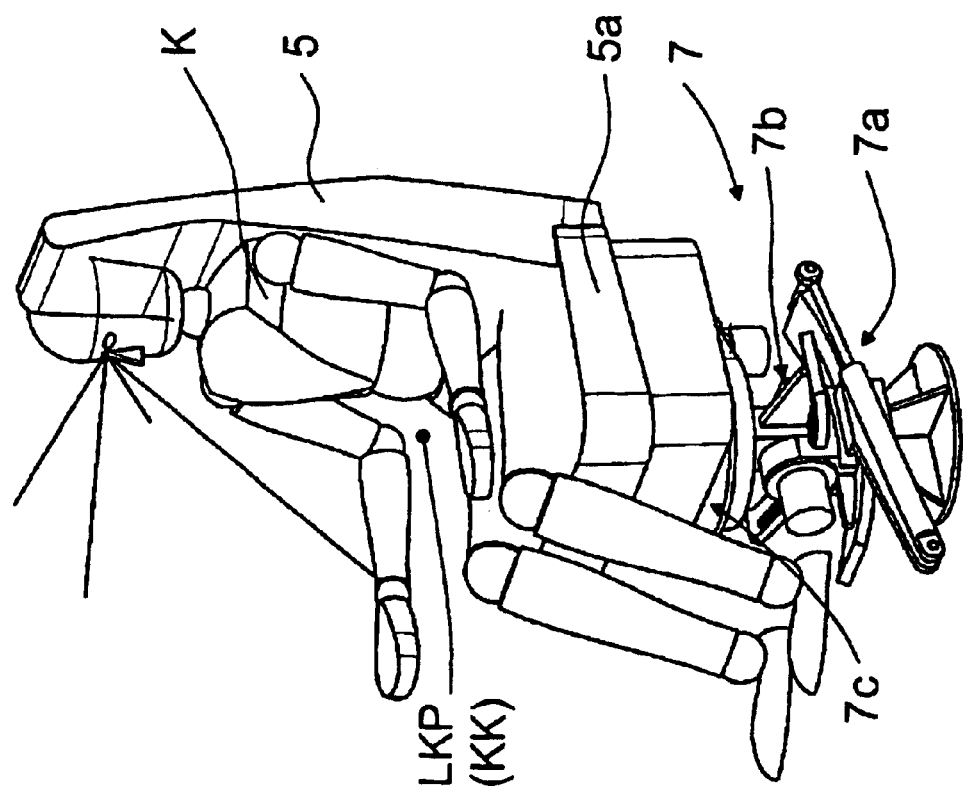
FIG. 5 shows, in a slanted perspective view from above, the seat and control mechanism for the cabin structure according to FIG. 2.

As shown particularly in FIG. 4, the control mechanism 7 is placed between the working base 9 (in reality, in horizontal position VA) and the bottom part 3 of the cabin element 4 (in reality, tilted according to the frame position KA) so that the first 7a and second 7b means of the control mechanism 7 for tilting the working base are placed, in the height direction, underneath the third 7c means of the control mechanism 7. Furthermore, the movements of the first 7a and second 7b means of the control mechanism 7 for tilting the working base 9 are arranged to be effected around a substantially joint movement center LKP, wherein this movement center LKP is preferably on the Z axis and placed above the seat part 5a of the seat 5 intended for the operator K of the working machine 2, preferably to be placed substantially at the level of the operator's K hip, as shown in FIG. 5.

The working base 9 and the bottom part 3 of the cabin element 4 of the cabin structure 1 are thus connected by the control mechanism 7 so that the lower one 7a of the first and second means 7a, 7b implementing the tilting of the working base 9 in relation to the frame of the working machine 2 is connected to the bottom part 3, for example, by means of a flange support, and the third 7c means for rotating the working base 9 are connected to the working base 9, its lower surface, for example to the central elevated part 9a in connection with the working base 9.

A cover arrangement is placed in the point of linkage between the bottom part 3 and the working base 9 to connect the working base 9, separate from the control mechanism 7, to the cabin element 4 during their respective movements. The cover arrangement preferably consists of two parts in such a way that its first part the annular collar part 10a, which is connected to the outer edge of the working base 9, at least its outer surface having a spherical shape, extends downwards, and the second part 10b consists of that part of the inner surface 3a of the bottom part 3 which is exposed during the movements of the working base 9, as shown in FIG. 4. To provide the system of movements presented above, it is advantageous that the shape of the bottom part 3 of the cabin element 4, at least of the inner surface 3a, at least on that range of height dimension in which the working base 9 moves during the respective movements of the working base 9 and the frame of the working machine 2, is a spherical surface, preferably so that the whole bottom part 3 of the cabin element 4, at least on the side of the inner surface, is substantially spherical. In the embodiment presented in the drawings, the bottom part 3 is, substantially as a whole, a sheet-like form piece with a spherical shape, whose upper edge 3b is connected to a substantially horizontal collar part formed at the lower edge 4a of the cabin element 4. Thus, in the presented embodiment, the horizontal cross-section of the bottom part 3 of the cabin element 4 reduces downwards, which makes it possible to save space, particularly in the height direction of the working machine. Furthermore, the center KK of the spherical form of the inner surface 3a of the bottom part 3 (FIG. 4) is placed above the seat part 5a of the seat 5, by the hip of the operator K. Preferably, the center KK joins the movement center LKP (see also FIG. 5). The diameter of the circular working base 9 is selected so that it is substantially placed in the upper part of the spherical shape of the bottom part 3, touching the spherical shape at the whole length of its circumference, wherein the annular collar part 10a whose outer surface has an at least spherical shape and which forms the first part of the cover arrangement is placed on the inner surface 8a of the bottom part 3.

What is claimed is:

1. A cabin structure for a working machine, comprising:
    a cabin element which is equipped with a bottom part and which is substantially stationary in relation to the working machine,
    working means placed inside the cabin element, comprising a seat for an operator of the working machine as well as display and control means for controlling the operations of the working machine,
    a movable working base, on which the working means are placed, and
    a control mechanism for leveling the working position of the operator, comprising first and second means for tilting the working base in the longitudinal direction and the transverse direction of the working machine, and third means for rotating the working base around a vertical axis of rotation, wherein
    the movements of the first and second means are arranged to take place around a joint movement center in such a way that the movement center is placed on said vertical axis of rotation and also above the working base, and
    the working base is placed above the bottom part, and the control mechanism, in turn, is placed between the working base and the bottom part in such a way that the first and second means are placed underneath the third means.

2. A cabin structure according to claim 1, wherein the working base is circular and is arranged touchingly at the inner surface of the bottom part, whose shape is a spherical surface at least on that range of height dimension in which the outer edge of the working base moves during respective movements of the working base and the frame of the working machine, wherein the center of the spherical shape is placed in said movement center.

3. A cabin structure according to claim 2, wherein the diameter of the working base is selected so that the working base is placed substantially at the upper edge of the spherical shape formed by the inner surface, touching the spherical shape at the whole length of its circumference.

4. A cabin structure according to claim 2, wherein the outer edge of the working base is provided with a downwards extending annular collar part which has at least an outer surface which is spherical and which is placed on the bottom part.

5. A cabin structure according to claim 1, wherein a movement center is placed above the seat part of the seat.

6. A cabin structure according to claim 5, wherein the a lower one of the first and second means is connected to the bottom part, and the third means are connected to the working base.

7. A cabin structure according to claim 1, wherein a lower one of the first and second means is connected to the bottom part, and the third means are connected to the working base.

8. A cabin structure according to claim 1, wherein the working base comprises an elevated part underneath the seat part of the seat, wherein at least the third means are placed in the space formed in connection with the elevated part.

9. A cabin structure according to claim 1, wherein a cover arrangement, separate from the control mechanism, is placed at the point of linkage between the bottom part and the working base to connect the working base to the cabin element during their respective movements, and that the first part of the cover arrangement is placed at the edge of the working base, to extend downwards, and the second part consists of the inner edge of the bottom part.

10. A cabin structure according to claim 9, wherein the first part of the cover arrangement consists of the collar part of the working base, which has at least an outer surface with a spherical shape and which is placed on the bottom part.

11. A cabin structure according to claim 1, wherein the bottom part is a piece formed from a sheet which is connected at its upper edge to a substantially horizontal collar part formed at the lower edge of the cabin element.

12. A cabin structure according to claim 11, wherein the bottom part is designed to have a downwards reducing horizontal cross-section.

13. A cabin structure according to claim 1, wherein the bottom part is designed to have downwards reducing horizontal cross-section.

14. A cabin structure according to claim 1, wherein the outer surface of the bottom part of the cabin element comprises connecting means for connecting the cabin structure to the frame of the working machine.

15. A cabin structure according to claim 1, wherein the movement center is placed above the seat part of the seat and substantially at the level of the hip of the operator.

16. A cabin structure according to claim 1, wherein the bottom part is designed to have a downwards reducing horizontal cross-section, in such a way that the whole bottom part is, at least on the side of the inner surface, substantially spherical.

17. A cabin structure for a working machine, comprising:
- a cabin element which is equipped with a bottom part and which is substantially stationary in relation to the working machine,
- working means placed inside the cabin element, comprising a seat for the an operator of the working machine as well as display and control means for controlling the operations of the working machine,
- a movable working base, on which the working means are placed, and
- a control mechanism for leveling the working position of the operator, comprising first and second means for tilting the working base in the longitudinal direction and the transverse direction of the working machine, and third means for rotating the working base around a vertical axis of rotation, wherein the movements of the first and second means are arranged to take place around a joint movement center in such a way that the movement center is placed on said vertical axis of rotation and also above the working base, the working base is placed above the bottom part, and the control mechanism, in turn, is placed between the working base and the bottom part, and the working base is circular and is arranged touchingly at the inner surface of the bottom part, whose shape is a spherical surface at least on that range of height dimension in which the outer edge of the working base moves during leveling movements of the working base, where the center of the spherical shape is placed in said movement centre.

18. A cabin structure according to claim 17, wherein the diameter of the working base is selected so that the working base is placed substantially at the upper edge of the spherical shape formed by the inner surface, touching the spherical shape at the whole length of its circumference.

19. A cabin structure according to claim 17, wherein the outer edge of the working base is provided with a downwards extending annular collar part which has at least an outer surface which is spherical and which is placed on top of the bottom part.

20. A cabin structure according to claim 18, wherein the outer edge of the working base is provided with a downwards extending annular collar part which has at least an outer surface which is spherical and which is placed on top of the bottom part.

* * * * *

UNITED STATES PATENT AND TRADEMARK OFFICE
CERTIFICATE OF CORRECTION

PATENT NO. : 6,755,270 B2
DATED : June 29, 2004
INVENTOR(S) : Into Saarinen

It is certified that error appears in the above-identified patent and that said Letters Patent is hereby corrected as shown below:

Title page,
Item [57], ABSTRACT,
Line 12, "pieced" should be deleted.

Column 4,
Line 47, "the" should be deleted.

Column 5,
Line 30, "the" should be deleted.

Signed and Sealed this

Seventh Day of December, 2004

JON W. DUDAS
*Director of the United States Patent and Trademark Office*